United States Patent
Paola et al.

(10) Patent No.: US 9,934,555 B1
(45) Date of Patent: Apr. 3, 2018

(54) PROCESSING AN IMAGE TO REDUCE RENDERING ARTIFACTS

(71) Applicant: Amazon Technologies, Inc., Reno, NV (US)

(72) Inventors: Christopher Mark Paola, Seattle, WA (US); Bradley Lawrence Hinkel, Kirkland, WA (US); Jason Chern Hooi Chionh, Singapore (SG); William Nathan John Hurst, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 177 days.

(21) Appl. No.: 14/221,157

(22) Filed: Mar. 20, 2014

(51) Int. Cl.
    *G06T 5/00* (2006.01)
    *G06T 11/00* (2006.01)

(52) U.S. Cl.
    CPC ............ *G06T 5/002* (2013.01); *G06T 11/001* (2013.01)

(58) Field of Classification Search
    None
    See application file for complete search history.

(56) References Cited

U.S. PATENT DOCUMENTS

| | | | |
|---|---|---|---|
| 8,144,995 B2* | 3/2012 | Thompson | G06F 17/30256 382/176 |
| 2007/0104382 A1* | 5/2007 | Jasinschi | G06T 7/2006 382/254 |
| 2009/0096897 A1* | 4/2009 | Saito | G06T 7/0081 348/241 |
| 2009/0175558 A1* | 7/2009 | Moriya | H04N 1/387 382/279 |
| 2011/0229024 A1* | 9/2011 | El-Maraghi | G06T 7/0083 382/162 |
| 2015/0002903 A1* | 1/2015 | Arai | G06K 15/1872 358/2.99 |

\* cited by examiner

*Primary Examiner* — Maurice L McDowell, Jr.
*Assistant Examiner* — Donna J Ricks
(74) *Attorney, Agent, or Firm* — Klarquist Sparkman LLP

(57) ABSTRACT

Image filter values can be obtained by applying a high-frequency or edge-detection image filter to an image to extract a level of image detail. The image can be divided into blocks of a predetermined size and the image filter values of the pixels in a block can be used to obtain a density value associated with the level of image detail for the block. For blocks where the density value exceeds a threshold amount, a degree of blur may be applied based on the density value. Thus, the image can be rendered so that only some of the blocks of the image are blurred while other blocks do not have blur applied.

19 Claims, 8 Drawing Sheets

PROCESSING AN IMAGE TO REDUCE RENDERING ARTIFACTS

BACKGROUND

As images are reproduced on different types of display devices, some of these display devices may produce artifacts when rendering the image. These artifacts in the image may be caused by various factors. For example, a moiré pattern may be displayed in an image if the image contains a repeating pattern that cannot correctly be displayed on the display device.

Different approaches may be used to reduce rendering artifacts in an image. For example, an image may be preprocessed (e.g., by a server storing the image) to display correctly on the display device. Alternatively, a display device with a fast graphics processing unit (GPU) may modify the displayed image to reduce rendering artifacts. However, it may be impractical to preprocess an image to correctly display on all of the various display devices, and display devices with slower GPUs, e.g., mobile devices, may not be able to modify the image quickly, causing a delay in rendering the image. Further, varying degrees of modifications may be required in an image, requiring adjustments to parts of the image instead of the image as a whole. Thus, the ability to efficiently reduce rendering artifacts on a display device may be desired.

DETAILED DESCRIPTION

Overview

The following description is directed to techniques and solutions for processing an image (e.g., using a high-frequency or edge-detection filter and blur filter) to reduce rendering artifacts. For example, applying varying degrees of blur to portions of an image containing artifacts can provide a more visually pleasing image than blurring the entire image. In addition, applying varying degrees of blur to portions of an image containing artifacts instead of applying more computationally expensive means to reduce artifacts may be more efficient on display devices with slower GPUs. As used herein, the term "display device" refers to any type of computing device (e.g., a server computer, desktop computer, laptop, tablet, mobile phone, or another type of computing device) that is capable of rendering an image.

In a particular embodiment, image filter values can be obtained by applying a high-frequency or edge-detection image filter to an image to extract a level of image detail. The image can be divided into blocks of a predetermined size and the image filter values of the pixels in a block can be used to obtain a density value associated with the level of image detail for the block. For blocks where the density value exceeds a threshold amount, a degree of blur may be applied to the block based on the density value. Thus, the image can be rendered so that only some of the blocks of the image are blurred while other blocks do not have blur applied.

Rendering Display Device

In any of the embodiments described herein, a display device can be provided to display an image with reduced rendering artifacts. For example, the display device can comprise a GPU for rendering images so that the GPU is integrated with the display. Alternatively, the GPU can be a dedicated graphics card separate from the display. However, the GPU is not limited to the foregoing descriptions, and may be any part of the display device capable of performing image rendering.

Figure 1:
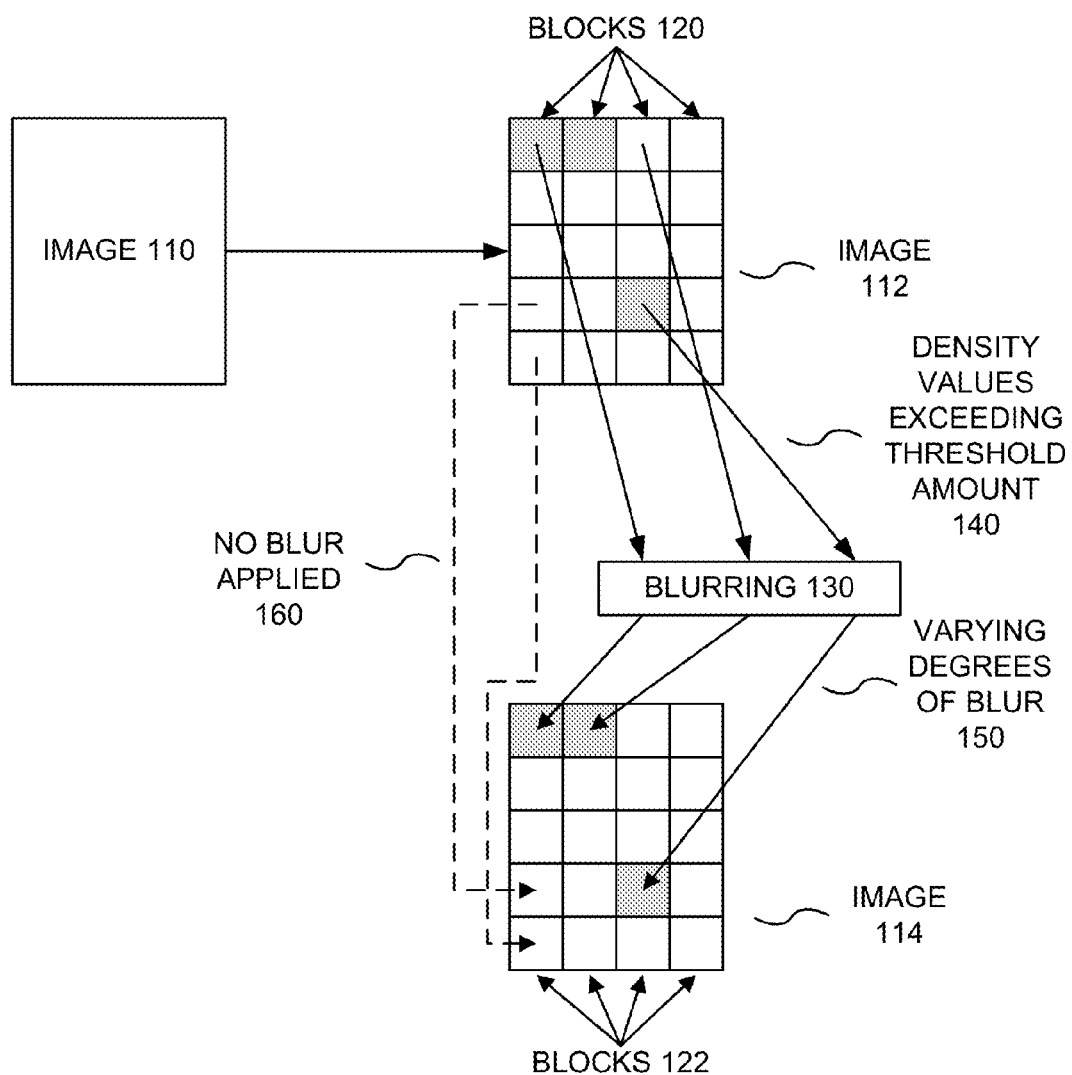
FIG. 1 is a system diagram showing an example environment capable of processing an image to reduce rendering artifacts.

FIG. 1 is a system diagram showing an example environment capable of processing an image to reduce rendering artifacts. The example environment comprises an image 110.

The image 110 is divided into blocks 120, which are a group of pixels (such as a 16×16 group of pixels) to produce a segmented image 112. A block 120 represents the smallest division of the image upon which a blur is applied (which will be described in detail further). By applying a blur on a block-basis versus blurring the entire image, areas of high frequency (e.g., repeating patterns) can be detected over a local area of the image and blur may be applied only to those areas. In some embodiments, a density value can be calculated for each block 120, which corresponds to the image filter values obtained by applying a high-frequency or edge-detection image filter to the block 120. The image filter values may indicate areas of the image 110 that contain artifacts (e.g., repeating patterns indicating a moiré effect). For example, the larger the image filter value, the more likely that the pixels of the image 110 contains an artifact (e.g., a repeating pattern).

The density values exceeding a threshold amount 140 are used to determine the degree of blur to be applied to a final image 114. For example, blurring 130 may be applied to the segmented image 112 on a block basis. The density values that exceed the threshold amount 140 are linearly correlated with a varying degree of blur 150 (i.e., a degree of blur for each block, the degree of blur varying between blocks) to be applied to the blocks 120 of image 110. Thus, although blur is applied on a block basis, each block 120 can have a different level of blur applied. In some embodiments, if a density value is below the threshold amount 140 (e.g., indicating that the block 120 does not contain sufficient repeating patterns or contains minimal repeating patterns), blurring 130 may be bypassed to output a block 120 where no blur is applied 160. In some embodiments, the blurring 130 is not bypassed, but instead the blurred blocks are not used in the final image 114. For blocks 120 for which blurring 130 has been applied, the blurred and original blocks 120 are combined to produce rendered blocks 122 for the final image 114. Since some of the rendered blocks 122 are blurred to varying degrees and other blocks are not blurred, areas of high detail (e.g., repeating patterns) may be rendered to reduce artifacts while keeping areas of low detail the same.

Image Filters

In some embodiments, a high-frequency filter may be used. A high-frequency filter refers to a filter that outputs values corresponding to a level of repeated patterns or rapid changes of brightness intensity (e.g., areas of an image with a high degree of repeated patterns or rapid changes of brightness intensity will have higher output values).

For example, a high-frequency filter may be an edge-detection filter. An edge-detection filter detects sharp discontinuities in an image. Discontinuities are abrupt changes in pixel intensity, which can be used to identify edges of objects in the image. However, the high-frequency filter need not be an edge-detection filter and may be any filter that can be used to identify the presence of artifacts in an image.

A Laplacian filter may be used as the edge-detection filter. A Laplacian filter refers to a filter that uses the second derivatives of signals of an image to find edges in the image. For example, using a first derivative of a signal to find an edge in a graphical representation of the signal requires the use of a threshold value above which an edge is detected. However, using the second derivative of the signals does not require a threshold value, since an edge can be detected where the line of the graph crosses the X-axis of the graph. The Laplacian of an image detects regions of rapid intensity change and therefore can be used for edge detection. However, the edge-detection filter is not limited to a Laplacian filter and may be any filter that can detect edges in images. For example, the high-frequency filter can be a gradient filter (e.g., Roberts, Prewitt, Sobel, etc.).

In some embodiments, a blur filter is also used. A blur filter allows an image to be softened by smoothing the transitions between pixels. Thus, smoothing allows images with sharp lines to appear less sharp.

A Gaussian blur filter may be used as the blur filter. A Gaussian blur filter refers to a blur filter using a Gaussian function. However, the blur filter is not limited to a Gaussian blur filter and may be any filter that softens an image. For example, the blur filter can be a radial blur filter.

Applying Blur to Image

Figure 2:
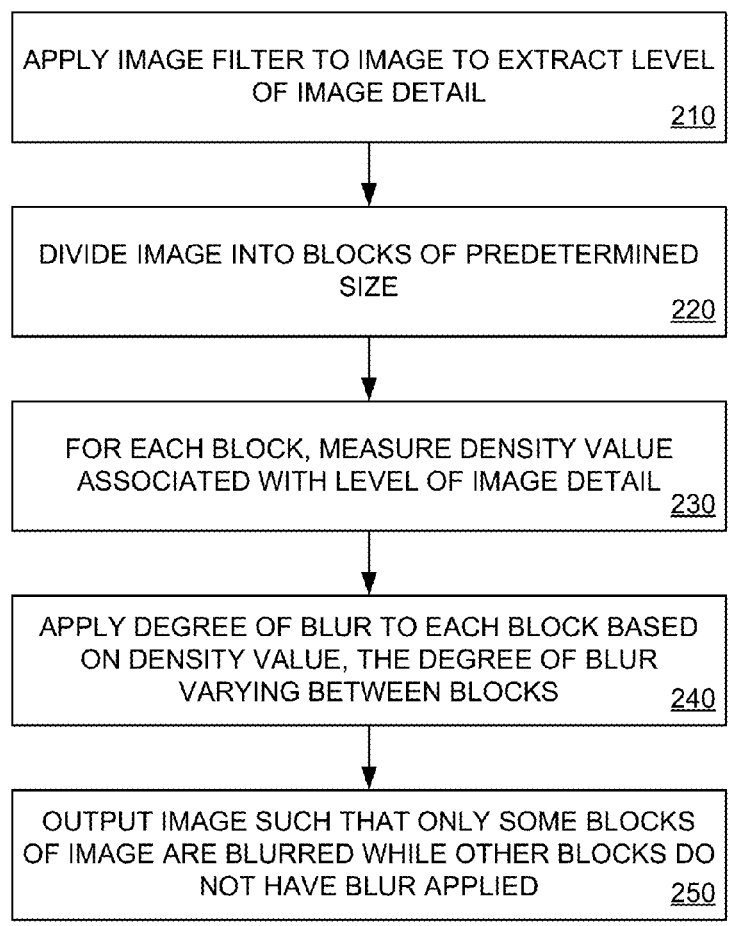
FIG. 2 is a flowchart of an example method of processing an image to reduce rendering artifacts.

FIG. 2 is a flowchart of an example method of processing an image to reduce rendering artifacts. An image can be located on, e.g., a storage device on a client device. Alternatively, the image can also be located on, e.g., a server hosting an image. The image received need not have any preprocessing performed on the image, i.e., the image can be the original image file.

At 210, an image filter is applied to the image to extract a level of image detail. The image filter can be, e.g., a high-frequency or edge-detection filter. The results from the image filter may be image filter values for the pixels of the image. These image filter values may represent, e.g., repeating patterns of high-frequency content or rapid changes of image brightness intensity between the pixels of the image. In some embodiments, a greyscale value can be assigned to each pixel in the image. For example, an image filter value can be represented by a value of 0 to 255, where the value represents a change in grey level between neighboring pixels. In some embodiments, the image filter may be a Laplacian filter. A Laplacian filter can be used to detect the changes in intensity between pixels to determine the levels of image detail.

At 220, the image is divided into blocks (i.e., groups of pixels) of a predetermined size. For example, a block may be 16×16 pixels in size. Although, 16×16 pixels is used in the example, a block may be any size. For example, a block may be 4×4, 8×8, or 32×32 pixels in size. A block represents the smallest unit upon which the blur is applied. By applying a blur on a block-basis versus blurring the entire image, areas of high frequency (e.g., repeating patterns) can be detected over a local area of the image and blur may be applied only to those areas. For example, if an image is divided into blocks, those block that are determined to contain areas of high frequency are blurred. To measure the density value, the greyscale values can be used to calculate a block score indicative of the level of image detail for the block.

At 230, a density value associated with the level of image detail for each block is measured. The measuring of the density value may be based, e.g., on the image filter values of the block. In some embodiments, a density value is a sum of the image filter values for a block. In some embodiments, the density value of a block can range from 0 to 65280 (e.g., for a 16×16 pixel block). However, the density value need not be the sum of the image filter values for a block and may be any calculation, e.g., using the image filter values for the block. For example, if a greyscale value has been assigned to each pixel in the image, the greyscale value can be used to calculate a block store indicative of the level of image detail for the block.

At 240, for blocks where the density value exceeds a threshold amount, a degree of blur is applied to each block based on the density value (i.e., all of the pixels of the block are blurred by a same amount). Thus, applying blur on a block-basis means that, within a block, a constant degree of blur is applied to all pixels in the block. However, the degree of blur being applied may vary between blocks (i.e., neighboring blocks need not have the same degree of blur applied). For example, a blur component (e.g., Gaussian blur filter) can be applied to the image, producing blurred blocks. Blurring is a transformation of each pixel in the block by applying a simple blurring function, such as a Gaussian function. The result of applying the blur is to smooth out some of the image's high-frequency components.

In some embodiments, in order to determine the level of blur applied to the block, a transform value may be calculated. The transform value can be a linear function of the density value, e.g., a linear value between 0 and 100 corresponding to the density value. The linear value between 0 and 100 represents a percentage of blending for the original block and the block modified by the blur component, i.e., the blurred block. For a larger density value or transform value, a larger degree of blur is applied.

In some embodiments, blocks with a density value below a threshold are not blurred. Density values below the threshold indicate blocks that do not display a noticeable rendering artifact (e.g., moiré effect). Those density values above the threshold are blocks that display a rendering artifact (e.g., moiré effect) above a threshold amount. In some embodiments, all of the blocks are blurred, but the blurred blocks below the threshold are not used. For blurred blocks, the pixels of the original block and the blurred block may be blended using the transform value. For example, if a transform value is 50 (for values between 0 and 100), then the pixels of the original block and the blurred block are blurred at a ratio of 1:1, i.e., 50% of the value of the original block and 50% of the value of the blurred block. In some embodiments, a transform value need not be calculated, and instead, the density value can be used to determine the amount of blending. For example, for a density value within a certain range, a degree of blending based on the density value may be applied to the original pixel color and a blur pixel color. Thus, for blocks with larger density values, a larger amount of blur may be applied.

In the above description, the degree of blur is calculated using the density value via a linear function. However, in some embodiments, a non-linear function can be applied to the density value. For example, a logarithmic or exponential function can be applied. Further, in some embodiments, a resulting transform value represents the percentage at which a blurred block and an original block are blended. However, the transform value can represent other ways of blurring. For example, the transform value may correspond to a mapping for the blurring.

At 250, the image is outputted such that only some of the blocks of the image are blurred while other blocks do not have blur applied. Outputting the image can include rendering the image on a display of the client device. It should be noted that each process block of FIG. 2 can be applied as real-time processing (as opposed to pre-processing) on a client device. Thus, the real-time processing can occur after a user selects the image to be viewed, and results in rendering the image of the client device. The blurring (or blending) on a block basis can enhance rendering speed, allowing processing on client devices with even with limited GPU processing power.

Figure 3:
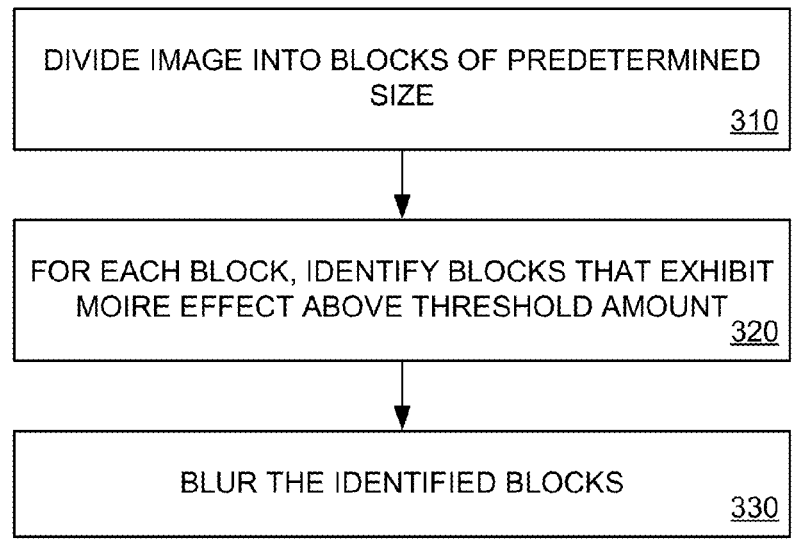
FIG. 3 is a flowchart of an example method of processing an image to reduce rendering artifacts.

FIG. 3 is another flowchart of an example method of processing an image to reduce rendering artifacts.

At 310, the image is divided into blocks of a predetermined size. A block may be 16×16 pixels or some other size. In some embodiments, an edge-detection filter may be applied to the image prior to dividing the image into blocks. The edge-detection filter may be, e.g., a Laplacian filter. In an alternative embodiment, the block size can be modified by a user through a user interface. In an alternative embodiment, the edge-detection filter may be applied to the image after dividing the image into blocks.

At 320, for each block of the image, blocks that exhibit a moiré effect above a threshold amount are identified. Blocks that exhibit a moiré effect can be determined by applying, e.g., an edge-detection filter. For example, an edge-detection filter can be applied to the image to obtain values corresponding to a level of detail. An area with a high level of detail corresponds to an area of repeating patterns of high-frequency content, i.e., an area exhibiting a moiré effect.

In some embodiments, a greyscale value can be assigned to each pixel of the image as a result of applying the filter. The greyscale values can be used to calculate a score indicative of the presence of edges in a block. The score can be associated with a degree of change in pixel values between neighboring pixels. For example, a sharp contrast in pixel values is indicative of edges in a block. In some embodiments, a density value can be calculated using the scores. For example, a simple density function can include a summation of the scores.

At 330, the identified blocks (i.e., blocks that exhibit a moiré effect above a threshold amount) are blurred. In some embodiments, the blurring may apply a degree of blur based on a level of moiré effect in the block. The blurring may apply a degree of blur to each block, where the degree of blur being applied varies between blocks. A larger degree of blur may be applied for a larger level of moiré effect. In some embodiments, the blur function is only applied to blocks that are identified as exhibiting the moiré effect above the threshold amount. In other embodiments, the blur function is applied to all of the blocks, but only those blurred blocks that exhibit a moiré effect above the threshold amount are used to render the image. Further, in some embodiments, an original pixel color and a blur color of a pixel may be blended. If a density value was calculated, the amount of blending may correspond to the density value. In some embodiments, the degree of blur may be calculated via a linear function.

Figure 4:
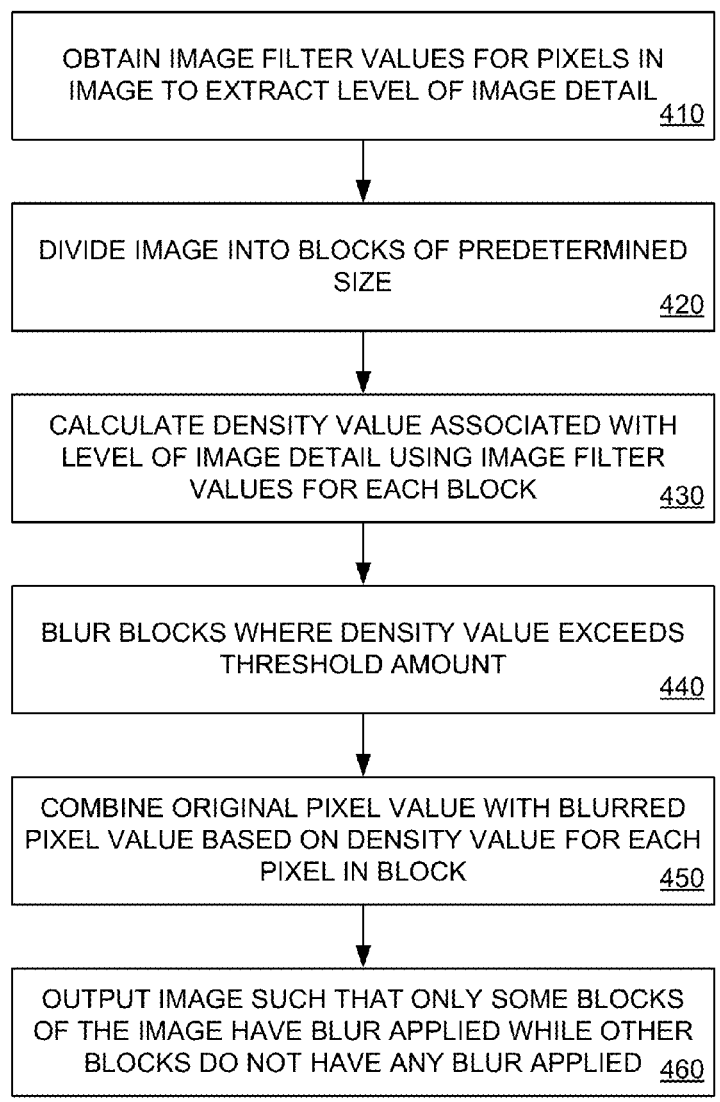
FIG. 4 is a flowchart of an example method of processing an image to reduce rendering artifacts.

FIG. 4 is another flowchart of an example method of processing an image to reduce rendering artifacts. The method of FIG. 4 will also be explained with regard to the diagram of FIG. 5.

Figure 5:
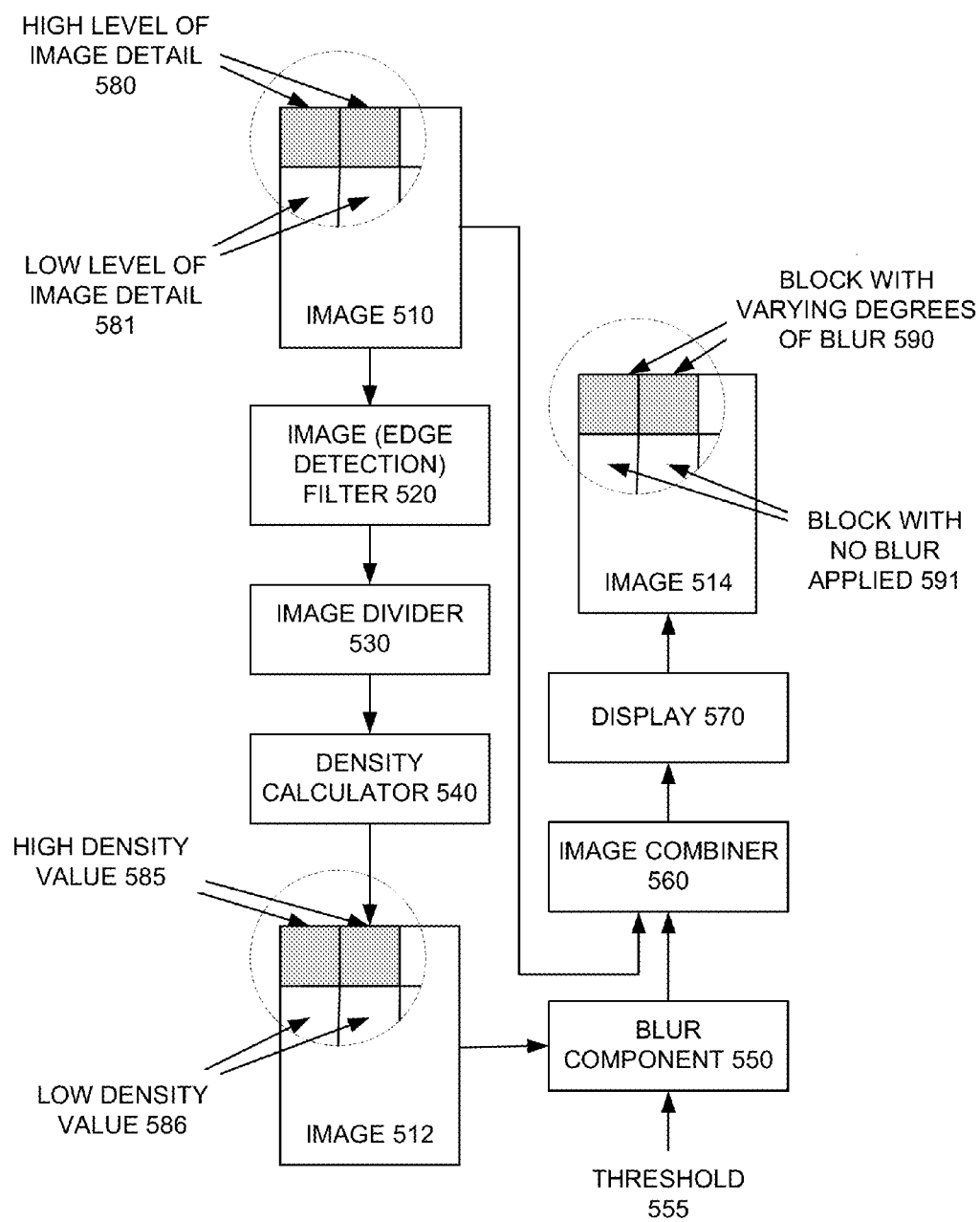
FIG. 5 is an example system diagram showing further details of a high-frequency or edge-detection filter being applied to an image.

At 410, image filter values for the pixels in an image are obtained to extract a level of image detail. For example, as shown in FIG. 5, an image filter 520, e.g., an edge-detection filter, is applied to an image 510 to detect areas with a high level of image detail 580 and a low level of image detail 581. The image filter 520 may be, e.g., a Laplacian filter. The image filter 520 may obtain image filter value for pixels in an image to extract a level of image detail.

At 420, the image is divided into blocks of a predetermined size. A block may be 16×16 pixels or some other size. An image divider 530 may divide the image 510 into blocks to produce a segmented image 512. The segmented image 512 may be divided into blocks with a high level of image detail 580 and a low level of image detail 581.

At 430, for each block, a density value associated with a level of image detail is calculated using the image filter values. For example, a density calculator 540 may be used to calculate the density values for the segmented image 512. Thus, a block with a high level of image detail 580 corresponds to a block with a high density value 585, and conversely, a block with a low level of image detail 581 corresponds to a block with a low density value 586. The density value may be, e.g., a sum of the image filter values of the pixels in the block.

At 440, for blocks where the density value exceeds a threshold amount, the blocks may be blurred. For example, a blur component 550 may be used to blur the blocks where the density value exceeds a threshold 555. The blur component 550 may be, e.g., a Gaussian blur filter. Thus, blurring can be applied on a block basis using the density value calculation, and different blocks can have different degrees of blur applied. In an alternative embodiment, all blocks may be blurred using the blur component. During the combining of the blocks (which is described below) blurred blocks that are below the threshold amount are not used (i.e., only the original pixel value is used).

At 450, for blocks where the density value exceeds a threshold amount, an original pixel value may be combined with a blurred pixel based on the density value for each pixel in the block. For example, an image combiner 560 may be used to combine an original pixel value and a blurred pixel value for each pixel in a block. The density value may be used to determine the degree of blur performed on the original pixel value and a blurred pixel value. For example, for a block with a low density value, the image combiner 560 may use a greater amount of the original pixel value than the blurred pixel value when blending the pixels, i.e., a greater ratio of the original pixel value than the blurred pixel value. Conversely, for a block with a high density value, the image combiner 560 may use less of the original pixel value than the blurred pixel value when blending the pixels, i.e., a lower ratio of the original pixel value than the blurred pixel value. Thus, varying degrees of blur may be applied to blocks of the image.

At 460, the image is outputted such that some of the blocks of the image have blur applied while other blocks do not have any blur applied. For example, a display 570 may output the rendered image 514. For blocks with a high density value 585 that exceed the threshold 555, blocks with varying degrees of blur 590 may be output (i.e., each pixel in the block are blurred a same amount, but different blocks may be blurred to different degrees). For blocks with a low density value 586 that do not exceed the threshold 555, blocks with no blur applied 591 may be output.

Figure 6:
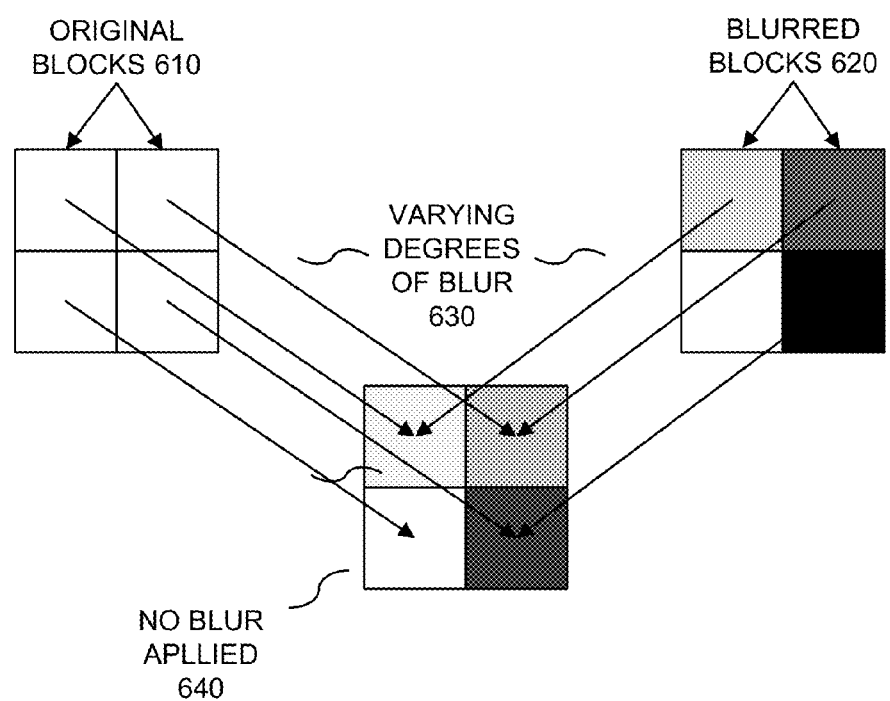
FIG. 6 shows further details of a blur filter being applied to the image.

FIG. 6 shows further details of a blur filter being applied to the image. The original blocks 610, i.e., blocks from the original image, are combined with blurred blocks 620, i.e., blocks upon which a blur filter has been applied. The original blocks 610 and the blurred blocks 620 are combined with varying degrees of blur 630 to produce the combined blocks. For example, if the density values of the blocks are scaled between 0 and 100, a block with a scaled density value of 100 will only output the blurred block 620, i.e., the original block 610 is not used. For a density value of 50, half the value of the original block 610 and half the value of the blurred block 620 will be used for the output, e.g., if the value of the original block is 200 and the blurred block is 100, the value of the combined block is 150. For a density value of 0, or if the density value does not exceed the threshold, no blur is applied 610, i.e., only the original block 610 is used. Although, in the previous examples, the combining is described as being performed between blocks, it should be understood that it is the values of the pixels of the block are being combined. Thus, for a block with a scaled density value of 50, half of the original pixel value and half of the blurred pixel value are used for the combined pixel value for each pixel of the block. Those skilled in the art will recognize that although this example is a simple combining function for generating the blur, other functions for combining can be used in order to generate the blurred image.

Example Computing Systems

Figure 7:
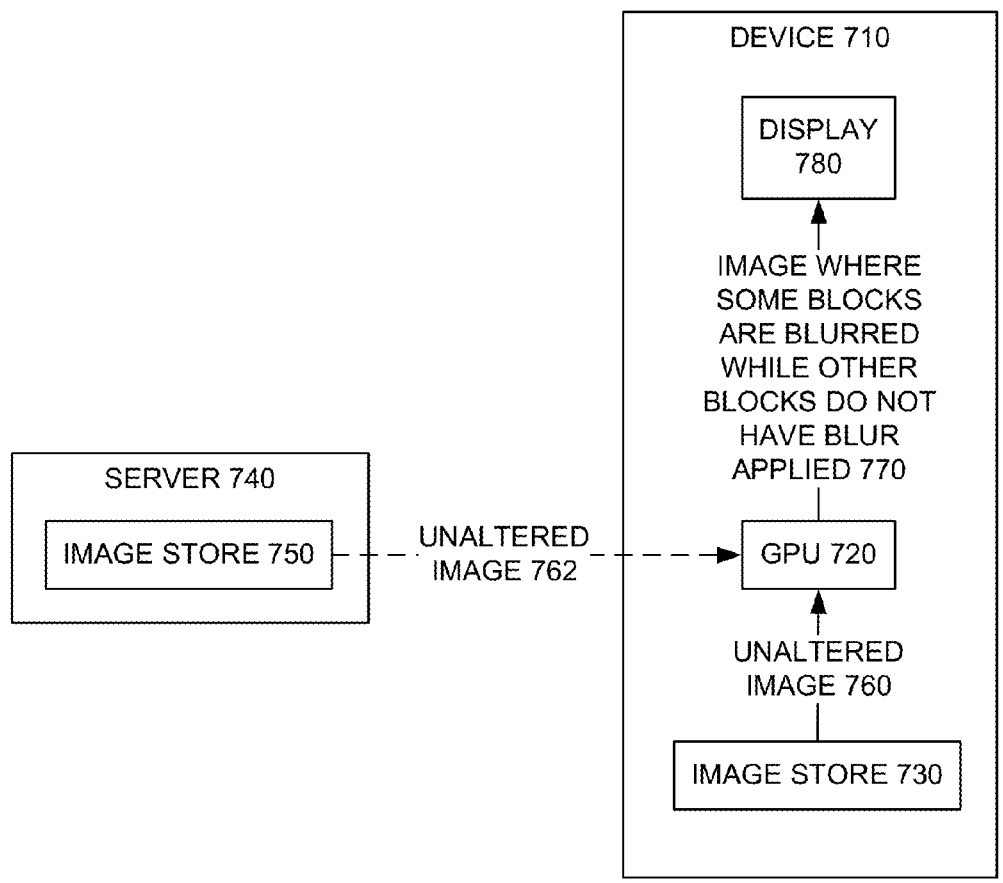
FIG. 7 depicts a generalized example of a suitable computing environment for displaying an image with reduced artifacts.

FIG. 7 depicts a generalized example of a suitable computing environment for displaying an image with reduced artifacts. The computing environment is not intended to suggest any limitation as to scope of use or functionality, as the innovations may be implemented in diverse general-purpose or special-purpose computing systems.

With reference to FIG. 7, the computing environment includes a computing device 710. For example, the computing device 710 can be any of a variety of computing devices (e.g., desktop computer, laptop computer, server computer, tablet computer, mobile device, etc.). The computing device 710 comprises one or more GPUs 720, an image store 730 and a display 780. The image store 730 may be volatile memory (e.g., registers, cache, RAM), non-volatile memory (e.g., ROM, EEPROM, flash memory, etc.), or some combination of the two, accessible by the GPU 720. The image store 730 may store one or more unaltered images 760. In some embodiments, the computing environment may also comprise a server 740 including an image store 750. The image store 750 may also store one or more unaltered images 762. The GPU 720 may receive an unaltered image 760 or 762 from the image store 730 or image store 750, respectively. Herein, an unaltered image refers to an image where no preprocessing is performed (e.g., by the server 740 or the computing device 710). Thus, the GPU 720 receives the unaltered image and renders the image with reduced artifact in real-time on the computing device 710. Any of the previously described methods can be performed in real-time on the computing device 710. The rendered image is output to the display 780 where some blocks of the image are blurred while other blocks do not have blur applied 770.

In the previous description, the rendering of the image with reduced artifacts in real-time is described as being performed on the computing device 710. However, in some embodiments, the server 740 may reduce the artifacts of the image before sending the image to the computing device 710. Thus the reducing artifacts need not necessary be performed on the computing device 710. Any of the previously described methods may be performed on the server 740 to produce an image with reduced artifacts.

Figure 8:
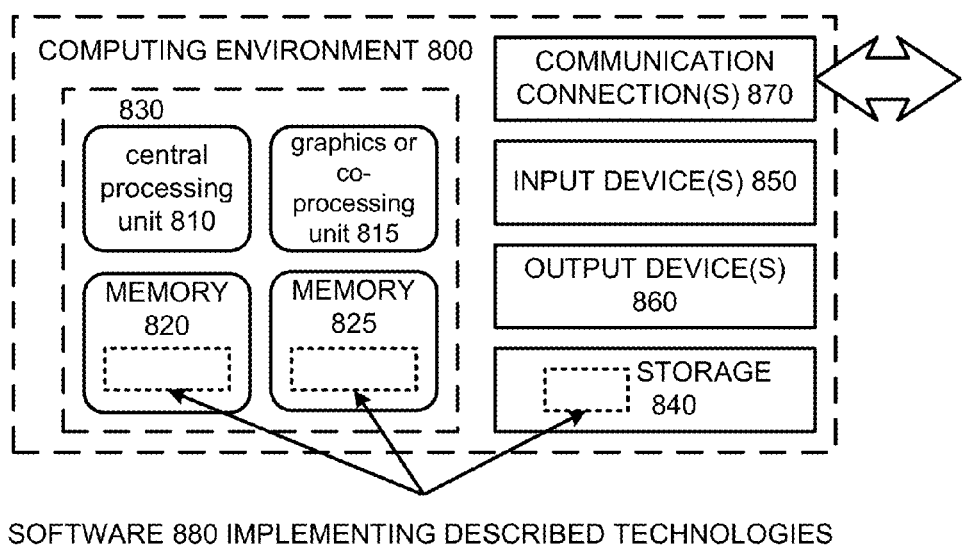
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, mobile device, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit (GPU) or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. For video encoding, the input device(s) 850 may be a camera, video card, TV tuner card, or similar device that accepts video input in analog or digital form, or a CD-ROM or CD-RW that reads video samples into the computing system 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of processing an image to reduce artifacts, comprising:
    applying, in a hardware processing unit, an image filter to an image to extract a level of image detail;
    dividing the image into blocks of a predetermined size;
    for each block, measuring a density value associated with the level of image detail, wherein measuring the density value associated with the level of image detail comprises using greyscale values associated with the image to calculate a block score indicative of the level of image detail for the block;
    for blocks wherein the density value exceeds a threshold amount, applying an increasing degree of blur to each block based on an increasing density value, wherein the degree of blur varies between blocks and wherein no blur is applied for blocks having a density value below the threshold amount; and
    outputting the image such that only some of the blocks of the image are blurred while other blocks do not have blur applied; wherein some of the blurred blocks are not output to the image.

2. The method of claim 1, wherein the image filter is a Laplacian filter.

3. The method of claim 1, wherein higher levels of image detail correspond to repeating patterns of high-frequency content in a block.

4. The method of claim 1, wherein the degree of blur is calculated using the density value via a linear function.

5. The method of claim 1, wherein applying a degree of blur comprises blending an original pixel color with a blur color of the pixel, and wherein an amount of blending corresponds to the density value.

6. A computer-readable storage media, which is nonvolatile, including instructions thereon for executing a method of reducing moiré rendering effects in an image, comprising:
dividing an image into blocks of a predetermined size;
for each block, identifying blocks that exhibit a moiré effect above a threshold amount by using greyscale values of the image to calculate a score indicative of a presence of edges in the blocks; and
blurring the identified blocks, wherein blocks that exhibit the moiré effect below the threshold amount have no blurring applied, and blocks that exhibit the moiré effect above the threshold amount have a linearly increasing blur based on a linearly increasing density level, and wherein a portion of blocks that have already been blurred are discarded.

7. The computer-readable storage media of claim 6, the method further comprising applying an edge-detection filter to the image prior to dividing the image into blocks.

8. The computer-readable storage media of claim 7, wherein edge-detection filter is a Laplacian filter.

9. The computer-readable storage media of claim 6, wherein identifying blocks that exhibit a moiré effect comprises calculating a density value based on the calculated score indicative of the presence of an edge of the pixels of the block; and
wherein the blurring the identified blocks comprises blending an original pixel color with a blur color of the pixel, wherein an amount of blending corresponds to the density value.

10. The computer-readable storage media of claim 6, wherein identifying blocks that exhibit a moiré effect comprises calculating a degree of blur via a linear function.

11. The computer-readable storage media of claim 6, wherein the blurring the identified blocks comprises applying a degree of blur to each block, wherein the degree of blur being applied varies between blocks, but is constant within a block.

12. The computer-readable storage media of claim 6, wherein the method is performed in real-time on a computing device.

13. A computing device suitable for processing an image to reduce artifacts, the computing device including a processor for implementing a method comprising:
filtering an image to obtain image filter values for pixels in an image to extract a level of image detail;
dividing the image into blocks of a predetermined size;
calculating a density value associated with the level of image detail using the image filter values for each block through using greyscale values of each block;
blurring the blocks where the density value exceeds a threshold amount and not blurring blocks where the density value is below the threshold;
combining an original pixel value with a blurred pixel value based on the density value for each pixel in the block; and
displaying the image such that some of the blocks of the image have blur applied while other blocks do not have any blur applied, and wherein one or more blurred blocks are disregarded in the displayed image.

14. The computing device of claim 13, wherein the filtering of the image uses an edge-detection filter.

15. The computing device of claim 14, wherein the edge-detection filter is a Laplacian filter.

16. The computing device of claim 13, wherein the blurring uses a Gaussian blur filter.

17. The computing device of claim 13, wherein a size of a block is 16×16 pixels.

18. The computing device of claim 13, wherein the density value is a sum of the image filter values of pixels in the block.

19. The computing device of claim 13, wherein a varying degree of blur is applied to different blocks.

* * * * *